United States Patent
Kumar et al.

(10) Patent No.: US 10,819,817 B2
(45) Date of Patent: Oct. 27, 2020

(54) HTML5 MULTIMEDIA REDIRECTION

(71) Applicant: Dell Products L.P., Round Rock, TX (US)

(72) Inventors: Ankit Kumar, Deoghar (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/267,243

(22) Filed: Feb. 4, 2019

(65) Prior Publication Data

US 2020/0252473 A1 Aug. 6, 2020

(51) Int. Cl.
*H04L 29/08* (2006.01)
*G06F 16/955* (2019.01)

(52) U.S. Cl.
CPC ........ *H04L 67/2814* (2013.01); *G06F 16/955* (2019.01); *H04L 67/02* (2013.01)

(58) Field of Classification Search
CPC .... H04L 67/2814; H04L 67/02; G06F 16/955
See application file for complete search history.

(56) References Cited

U.S. PATENT DOCUMENTS

| | | | | |
|---|---|---|---|---|
| 7,689,510 B2* | 3/2010 | Lannkin | ............ | G06F 16/4387 705/51 |
| 10,462,216 B1* | 10/2019 | Vysotsky | ............ | H04L 61/256 |
| 2005/0188413 A1* | 8/2005 | Mohammed | ............ | G06F 9/545 725/112 |
| 2005/0198623 A1* | 9/2005 | Amin | ............ | H04N 21/4331 717/144 |
| 2006/0069797 A1* | 3/2006 | Abdo | ............ | H04L 29/06027 709/231 |
| 2007/0043550 A1* | 2/2007 | Tzruya | ............ | G06F 9/452 703/24 |
| 2009/0102838 A1* | 4/2009 | Bullard | ............ | G06F 9/5044 345/419 |
| 2009/0248802 A1* | 10/2009 | Mahajan | ............ | G06F 9/541 709/204 |
| 2009/0323818 A1* | 12/2009 | Weiss | ............ | H04N 21/4622 375/240.18 |
| 2009/0327344 A1* | 12/2009 | Howard | ............ | H04L 65/607 |
| 2011/0138069 A1* | 6/2011 | Momchilov | ............ | H04L 65/605 709/231 |
| 2011/0289108 A1* | 11/2011 | Bhandari | ............ | H04N 21/41407 707/769 |
| 2012/0076197 A1* | 3/2012 | Byford | ............ | H04N 19/00 375/240.01 |

(Continued)

*Primary Examiner* — Blake J Rubin
(74) *Attorney, Agent, or Firm* — Kirton McConkie; Brian Tucker

(57) ABSTRACT

HTML5 multimedia redirection is implemented. When a multimedia application is started, a hooking library can be injected to enable the hooking library to modify the application's interactions with the Microsoft Media Foundation multimedia platform. These modifications include causing only a redirecting MFT to be enumerated so that the application will employ the redirecting MFT in the topology of a media pipeline created to play HTML5 video and/or audio. These modifications also include handling playback controls to synchronize the playback that is occurring on the client with the media session on the server.

20 Claims, 13 Drawing Sheets

(56) References Cited

U.S. PATENT DOCUMENTS

| | | | |
|---|---|---|---|
| 2013/0100242 A1* | 4/2013 | Canitz | G06F 16/9577 348/43 |
| 2013/0106873 A1* | 5/2013 | Andrews | H04N 19/436 345/520 |
| 2014/0192207 A1* | 7/2014 | Ji | H04N 17/004 348/184 |
| 2014/0222963 A1* | 8/2014 | Gangadharan | H04L 69/321 709/219 |
| 2014/0344332 A1* | 11/2014 | Giebler | H04L 67/42 709/203 |
| 2015/0237356 A1* | 8/2015 | Wu | H04N 19/70 375/240.03 |
| 2016/0006803 A1* | 1/2016 | Kumar | H04L 67/1091 709/203 |
| 2016/0210159 A1* | 7/2016 | Wilson | G06F 9/4411 |
| 2017/0220283 A1* | 8/2017 | Zhang | H04N 19/423 |
| 2017/0346864 A1* | 11/2017 | Nataros | H04L 65/80 |
| 2018/0124270 A1* | 5/2018 | Kanumuri | H04N 1/00962 |
| 2019/0004808 A1* | 1/2019 | Larson | G06F 15/167 |

\* cited by examiner

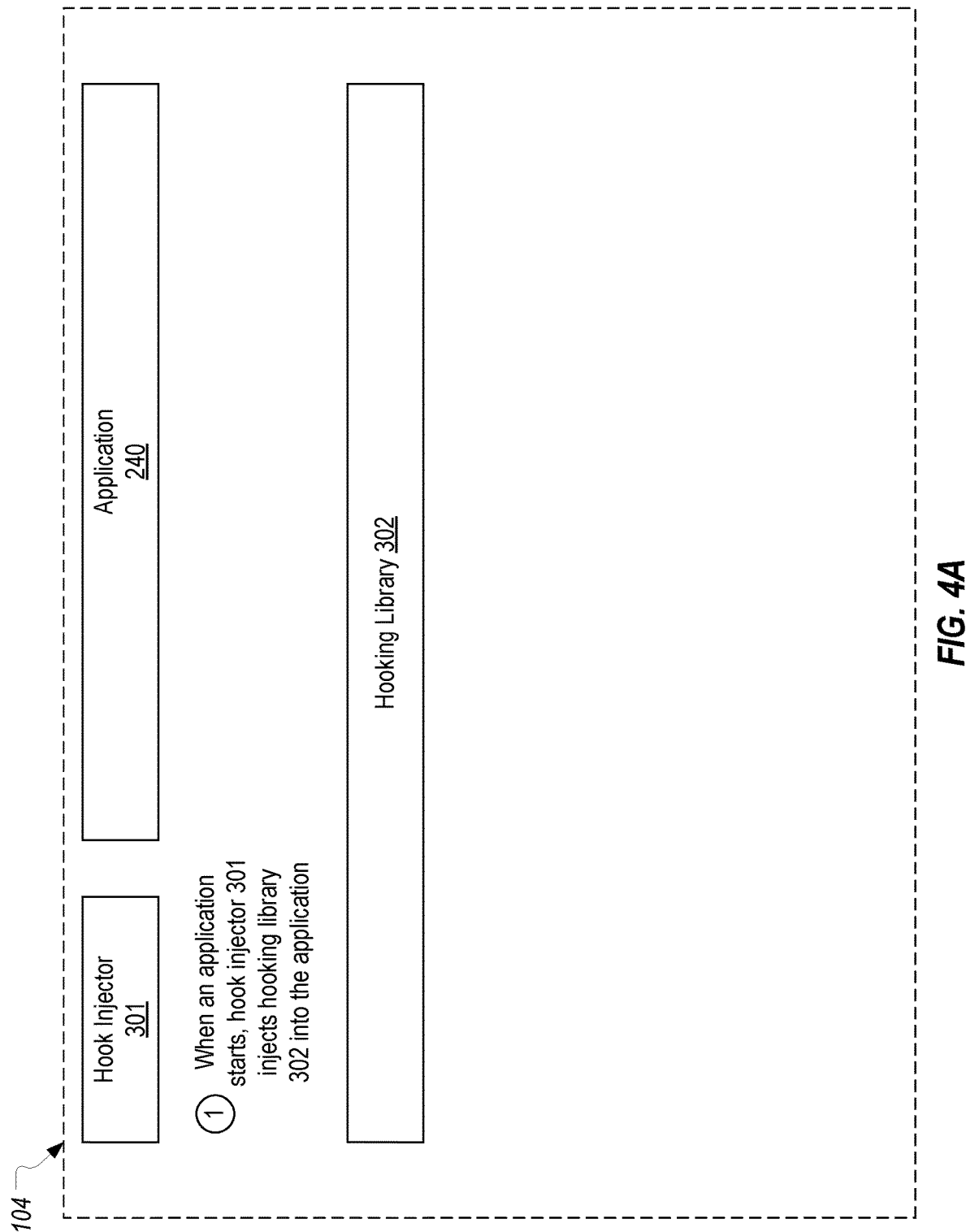

HTML5 MULTIMEDIA REDIRECTION

CROSS-REFERENCE TO RELATED APPLICATIONS

N/A

BACKGROUND

Multimedia redirection is a remote access technique that allows multimedia content (or only video content) to be transferred in its encoded format from the server to the client and then decoded and rendered by the client. This is in contrast to the server first decoding and rendering the content and then sending the rendered content as typical display data using the remote display protocol. In multimedia redirection, because the content is sent in its encoded format, when the original data stream is highly compressed, less bandwidth is required to transfer the content. Also, transferring the decoding and rendering of the content to the client reduces the load on the server.

Previously, most web-based multimedia content was provided as Adobe Flash content and processed using the Adobe Flash Player browser plugin. Various techniques were developed for redirecting Flash content. In general, Flash redirection involves sending the encoded Flash content to the client where the Adobe Flash Player in the client's browser would render it. This is in contrast to having the Adobe Flash Player in a server-side browser render the Flash content and then sending the rendered content to the client as display data using the remote display protocol.

Recently, most browsers and websites (e.g., YouTube) have replaced Flash video with HTML5 video. The HTML5 Specification introduced the <video> element as a standard way to embed video (and accompanying audio) in a web page without requiring a plugin. With this adoption of HTML5, however, previous Flash-based multimedia redirection techniques became obsolete. To address this, some providers have introduced HTML5 multimedia redirection techniques. For example, VMware offers an HTML5 multimedia redirection technique that is implemented as a Chrome extension and functions by modifying the <video> element. This technique has not worked well largely because the HTML5 content oftentimes commences playing before the plugin can modify the <video> element. Additionally, VMware's technique is Windows-specific and therefore is not available on client's running Linux or another operating system. Citrix also offers an HTML5 multimedia redirection technique that has not worked well. Citrix's technique requires manual intervention by editing the webpages to include a specific JavaScript script. For this reason, in a Citrix VDI environment, HTML5 multimedia redirection can only be implemented when the source of the webpage has enabled it, and therefore, as a practical matter, HTML5 multimedia redirection will only be available for intranet webpages.

Given the lack of a suitable HTML5 multimedia redirection technique, the majority of HTML5 content will not be redirected. In other words, the HTML5 videos will be downloaded, decoded and rendered by the server in the remote desktop and then the rendered content will be sent as display data over the remote desktop connection. This creates a number of problems. For example, when the network connection between the client and server has low bandwidth or high latency, the video will not be displayed smoothly and the video and audio will likely be out of sync. Additionally, the decoding of the video will consume a significant amount of server resources which will minimize the scalability of the server (e.g., the server will be able to support fewer remote desktops). There will also be an increase in consumption of server resources due to the fact that the rendered multimedia content will need to be encoded on the server into the format required by the remote display protocol (e.g., RDP, ICA, PCoIP, etc.). This excessive consumption of server resources is at its worst when the HTML5 video is viewed in full screen with high resolution, which is often the case when users view video content.

BRIEF SUMMARY

The present invention extends to methods, systems, and computer program products for implementing HTML5 multimedia redirection. When a multimedia application is started, a hooking library can be injected to enable the hooking library to modify the application's interactions with the Microsoft Media Foundation multimedia platform. These modifications include causing only a redirecting MFT to be enumerated so that the application will employ the redirecting MFT in the topology of a media pipeline created to play HTML5 video and/or audio. These modifications also include handling playback controls to synchronize the playback that is occurring on the client with the media session on the server.

In some embodiments, the present invention is implemented as a method for performing HTML5 multimedia redirection. A server-side application's request to enumerate media foundation transforms (MFTs) can be intercepted. The request defines an input media type. It can then be determined whether the input media type defined in the request matches a specified input media type. When the input media type defined in the request does not match the specified input media type, a response to the request can be provided to the server-side application where the response can list each enumerated MFT that matches the input media type defined in the request. In contrast, when the input media type defined in the request matches the specified input media type, the response to the request can be modified to list only a redirecting MFT.

In other embodiments, the present invention is implemented as computer storage media storing computer executable instructions which when executed implement a method for implementing HTML5 multimedia redirection. This method can include: injecting a hooking library into a server-side application, the hooking library configured to hook an enumeration function that is called to enumerate media foundation transforms (MFTs); in response to the server-side application calling the enumeration function, determining that the server-side application is requesting enumeration of MFTs that are configured to process a particular type of encoded content; modifying a list that is generated by the enumeration function to cause the list to include only a redirecting MFT; and in response to the server-side application calling the enumeration function, providing the modified list to the server-side application.

In other embodiments, the present invention can be implemented as computer storage media storing computer executable instructions which when executed on a server implement a hook injector, a hooking library and a redirecting MFT. The hook injector is configured to inject the hooking library into a multimedia application. The hooking library is configured to hook an enumeration function that the application calls to enumerate MFTs on the server to thereby cause only a redirecting MFT to be enumerated for a particular input media type. The hooking library is also configured to hook a create function that the application calls to create a media session on the server to thereby present a proxy class to the application when the application calls the create function. The redirecting MFT is configured to receive encoded content from a media source on the server and to redirect the encoded content to a client.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4D illustrate how the present invention modifies the process of creating a media pipeline to enable HTML5 multimedia redirection;

DETAILED DESCRIPTION

In this specification and the claims, the term "multimedia" should be construed as encompassing video content, audio content and audio/video content. In the majority of implementations, the present invention will involve redirecting both audio and video content. Currently, the H.264 is the standard that is primarily employed to encode multimedia content that is delivered using the HTML5 markup language, and therefore, H.264-based examples will be employed throughout this description. It is emphasized, however, that the present invention can be implemented in the same manner when other encoding formats are employed.

Figure 1:
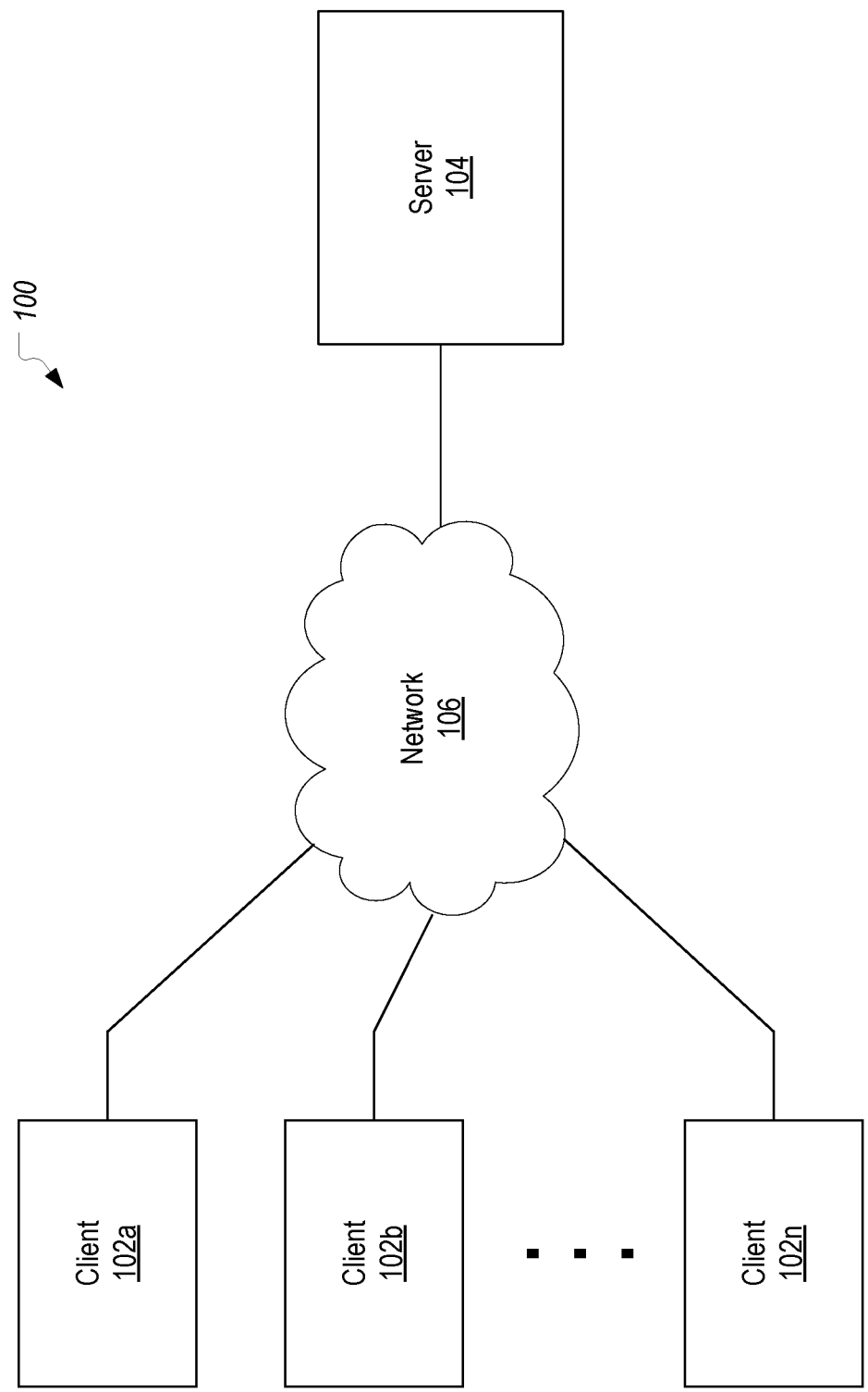
FIG. 1 illustrates an example computing environment in which the present invention can be implemented.

Given that the present invention is applicable to virtual desktop infrastructure (VDI) environments, a general overview of how a remote session can be established in a VDI environment will be given in FIG. 1. As shown, a VDI environment 100 is depicted as including a number of clients 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP), the Citrix® Independent Computing Architecture (ICA), the PC over IP (PCoIP) Protocol, etc.

Client 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104.

The Windows operating system, which is assumed to be the operating system on server 104, provides the Microsoft Media Foundation multimedia platform (hereinafter "Media Foundation"). Media Foundation is a platform on which developers can build applications, including browsers, which present multimedia content. A primary benefit of Media Foundation is its high-level APIs that simplify the process of writing media applications.

Figure 2:
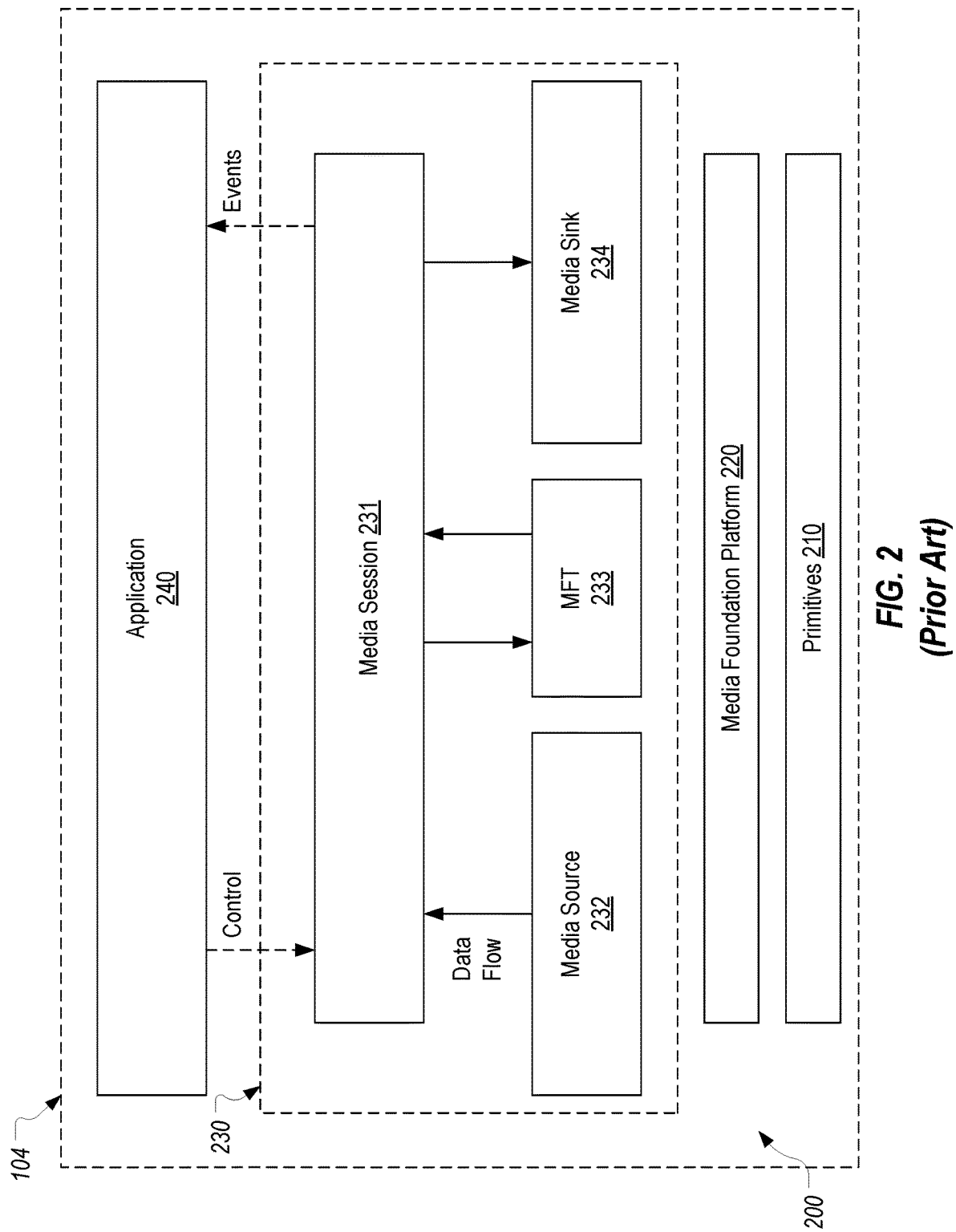
FIG. 2 illustrates the architecture of the prior art Microsoft Media Foundation multimedia platform that will be present on the server when the present invention is implemented.

FIG. 2 illustrates the architecture of Media Foundation 200 and is intended to provide context for the present invention. As indicated, Media Foundation 200 forms a part of the Windows operating system that executes on server 104. Starting from the bottom of the figure, Media Foundation 200 includes primitives 210, the Media Foundation platform 220 and a media pipeline 230. Primitives 210 are helper objects while the Media Foundation platform 220 provides core functionality that is used by media pipeline 230.

Media pipeline 230 contains three types of objects that generate or process media content: media source(s) 232, Media Foundation transform(s) or (MFT) 233 and media sink(s) 234. A media source 232 introduces media content into the media pipeline 230. The media source 232 may obtain this media content from a video file, a network stream, a hardware capture device, etc. An MFT 233 processes media content from a stream. For example, MFT 233 may be an encoder or a decoder. A media sink 234 consumes the media content. For example, media sink 234 could show video, play audio or write media content to a media file. Accordingly, as represented by the arrows, the media content flows from media source 232, through MFT 233 and to media sink 234. As indicated above, media sink 232, MFT 233 and media sink 234 will typically employ APIs exposed by Media Foundation Platform 220 to perform their respective functionality.

Media session 231 controls the flow of media content through media pipeline 230 and handles tasks such as quality control, audio/video synchronization and responding to format changes. An application 240, such as a browser or another media application, interfaces with media pipeline 230 via media session 231. Media session 231 provides the high-level APIs that simplify the interactions with Media Foundation 200.

As was introduced in the background, application 240 can represent a browser or other application that supports the HTML5 standard. More particularly, application 240 can be configured to support the HTML5<video> element. In such cases, to process a <video> element of a webpage or other content, application 240 may create a media session 231 which in turn would create the media source 232, MFT 233 and media sink 234 necessary to cause the video and/or audio content to be rendered. As represented, application 240 will send control commands to media session 231 and will receive events from media session 231. Of importance to the present invention, in this scenario, the processing performed by media pipeline 230 will occur entirely on server 104.

Figure 3:
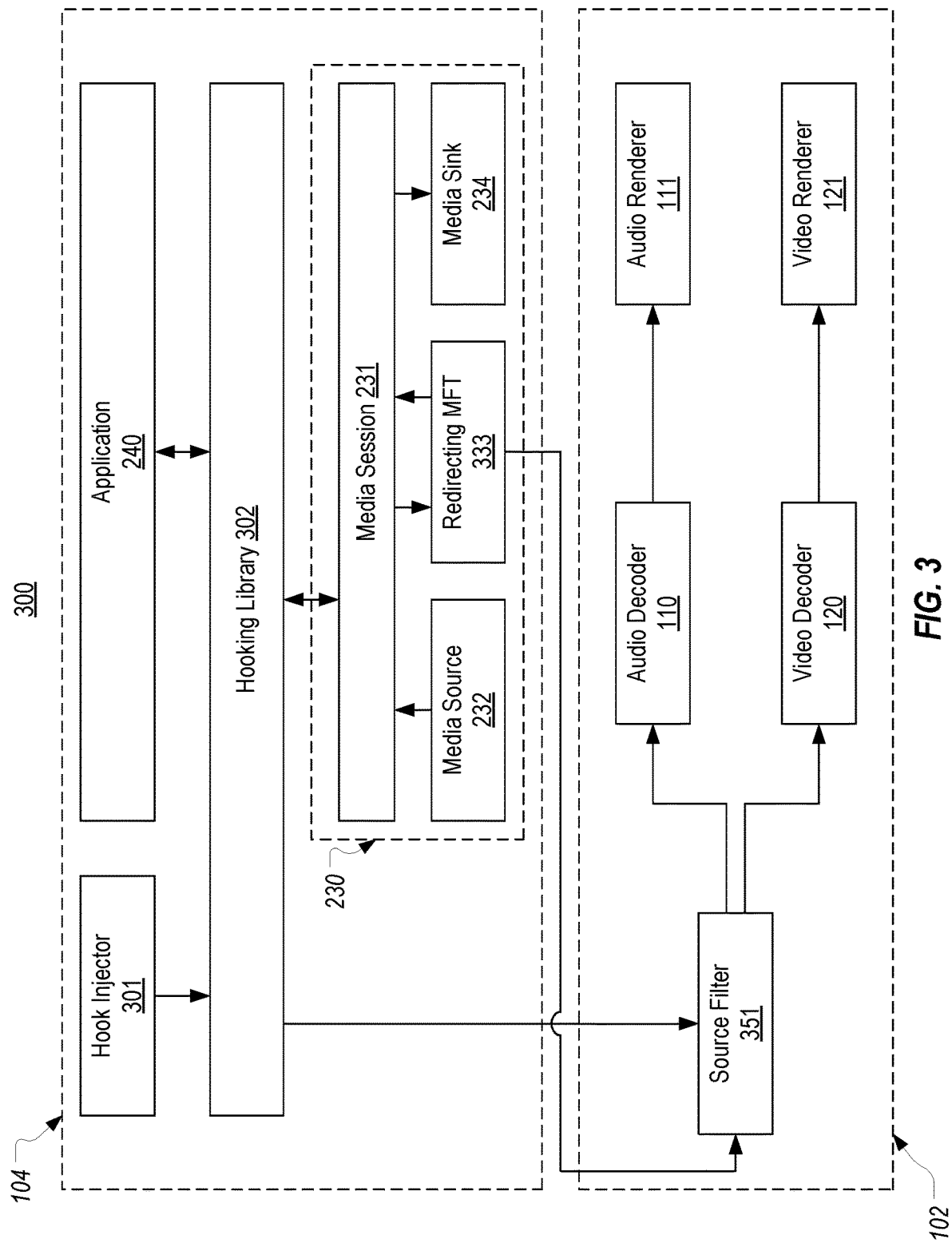
FIG. 3 illustrates how the architecture of the Microsoft Media Foundation multimedia platform is modified when the present invention is implemented.

FIG. 3 illustrates a VDI environment 300 that is configured in accordance with embodiments of the present invention. In particular, FIG. 3 illustrates various components that can be employed on server 104 and client 102 to implement HTML5 multimedia redirection within the Media Foundation architecture. Because the present invention implements HTML5 multimedia redirection within the Media Foundation architecture, HTML5 multimedia redirection will be available for any server-side application (e.g., Internet Explorer) that uses Media Foundation to decode and render multimedia content. Importantly, HTML5 multimedia redirection will be available when client 102 runs any operating system.

In FIG. 3, server 104 includes the same Media Foundation architecture as shown in FIG. 2. However, the invention introduces various additional components on server 104 and client 102 that implement the HTML5 multimedia redirection techniques. These components include the server-side hook injector 301, hooking library 302 and redirecting MFTs 333 as well as the client-side source filter 351.

Redirecting MFT 333 represents one or more custom MFTs within the Media Foundation platform and would typically include a video redirecting MFT and an audio redirecting MFT. To simplify the figures, only one redirecting MFT 333 is shown, but redirecting MFT 333 is intended to represent both a video and an audio redirecting MFT. It is noted, however, that embodiments of the present invention could be implemented where only a video redirecting MFT or an audio redirecting MFT is employed. As will be described in detail below, redirecting MFT 333 functions as an MFT so that it will receive media content from media source 232. However, rather than performing a transform on the media content (e.g., decoding), redirecting MFT 333 sends the still-encoded media content over a network connection to source filter 351.

To cause redirecting MFT 333 to be injected into media pipeline 230, the present invention provides hook injector 301 for injecting hooking library 302. As represented, hooking library 302 can hook various Media Foundation functions to modify their functionality. Hook injector 301 can use any suitable technique to inject hooking library 302. For example, hook injector 301 could cause hooking library 302 to be injected into all applications that may execute on server 104 or only into certain applications.

Figure 4B:
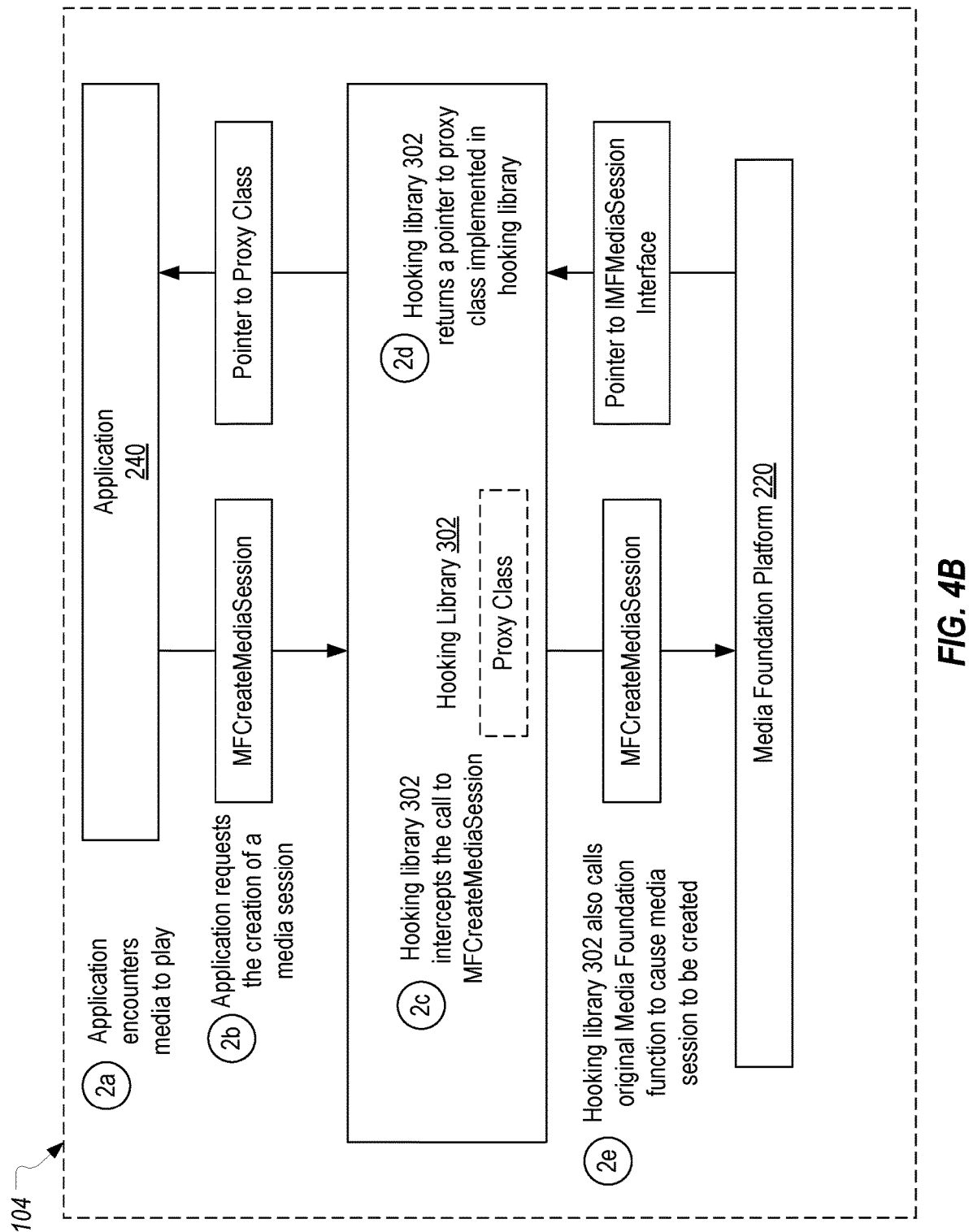

FIGS. 4A-4D illustrate how hooking library 302 modifies the process of creating a media pipeline to enable HTML5 multimedia redirection. In FIG. 4A, it is assumed that a media application 240 has started. For example, application 240 can represent Internet Explorer, another browser, or any application that is configured to employ Media Foundation on server 104. In step 1, hook injector 301 injects hooking library 302 into application 240. As indicated above, this injection of hooking library 302 can be accomplished in any of the many available ways. Of importance is the fact that the injection of hooking library 302 will allow hooking library 302 to intercept application 240's calls to the Media Foundation APIs.

Next, FIG. 4B illustrates the process of creating a media session. In step 2a, it is assumed that application 240 has encountered media to play. For example, if application 240 is a browser, step 2a can represent the loading of a webpage that includes an HTML5 <video> element. It is noted, however, that application 240 could carry out the steps shown in FIG. 4B at any time including prior to encountering any media to play (e.g. as part of the application's startup process). In any case, in step 2b, application calls the MFCreateMediaSession function that is provided as part of the Mf.dll in Media Foundation. As represented in step 2c, hooking library 302 is configured to intercept calls to the MFCreateMediaSession function so that they can be handled in a custom manner.

As is known, calls to the MFCreateMediaSession function return a pointer to the created media session's IMFMediaSession interface. The IMFMediaSession interface is the primary interface that applications use to control a media pipeline. However, rather than allowing application 240 to receive the pointer to the media session's IMFMediaSession interface that would normally occur when MFCreateMediaSession is called, in step 2d, hooking library 302 returns a pointer to a proxy class implemented within hooking library 302. As its name implies, this proxy class functions as a proxy for the media session's IMFMediaSession interface as will be further described below. Additionally, in step 2e (which may or may not occur after step 2d), hooking library 302 invokes the MFCreateMediaSession function so that a media session will be created by the Media Foundation framework. As explained above, this call will result in hooking library 302 receiving the pointer to the media session's IMFMediaSession interface.

Figure 4C:
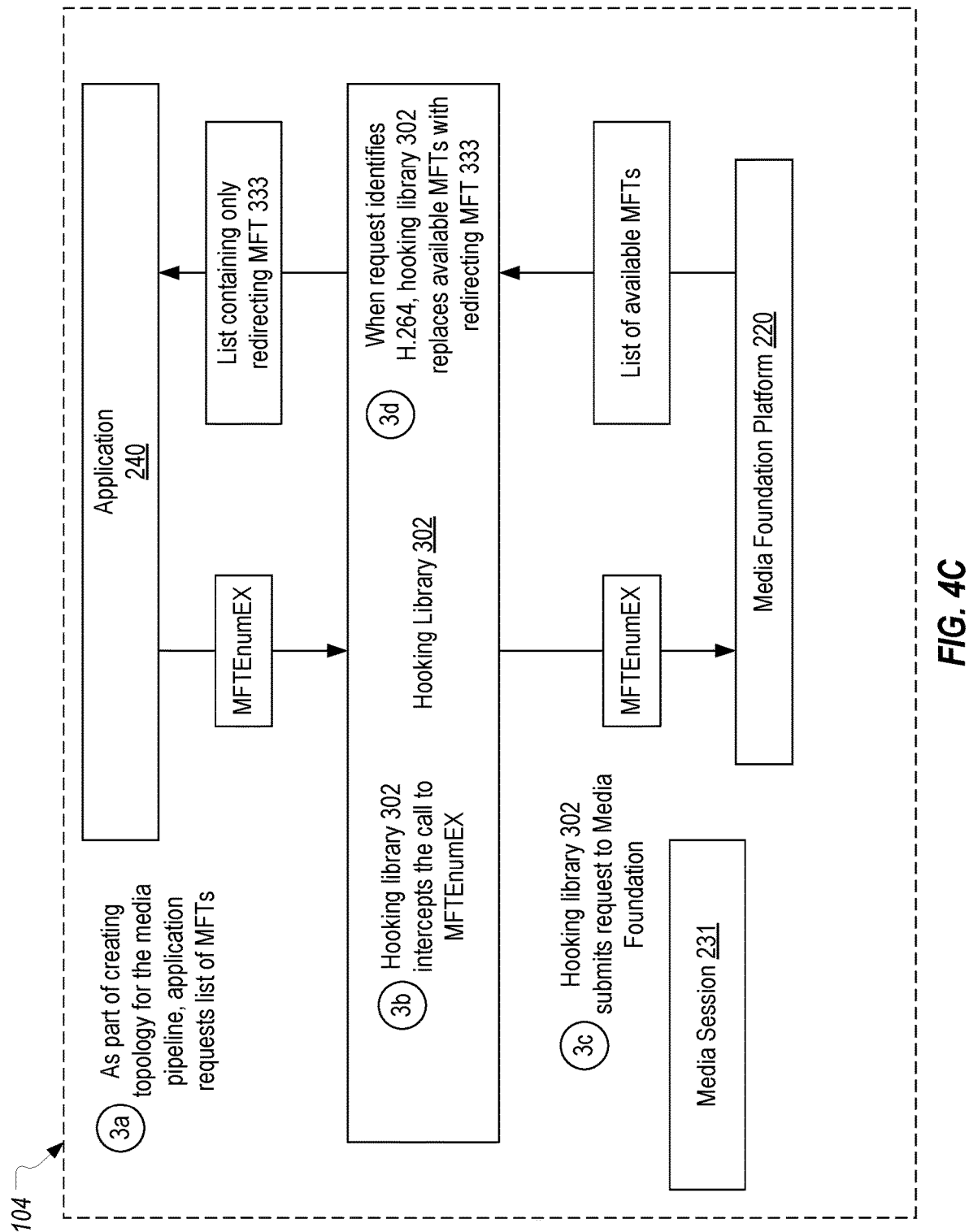

Turning to FIG. 4C, as a result of hooking library 302 calling MFCreateMediaSession, media session 231 will be created within Media Foundation. It is noted that application 240 will be unaware that it received a pointer to hooking library 302's proxy class rather than a pointer to media session 231's IMFMediaSession interface. In other words, application 240 will employ the pointer to the proxy class to invoke control commands of media session 231 as will be described below.

After media session 231 is created, application 240 will then commence creating the topology of a media pipeline. As represented in step 3a, the creation of the topology will include calling the MFTEnumEx (or MFTEnum) function to enumerate MFTs that are available for a particular category of MFT (i.e., application 240 specifies the category of MFTs to enumerate). These categories include audio decoders and video decoders among many others. In step 3*b*, hooking library 302 will intercept this call to MFTEnumEx. In step 3*c*, hooking library 302 calls MFTEnumEx so that Media Foundation will enumerate available MFTs in the category specified by application 240. In step 3*d*, if application 240 has requested enumeration of H.264-compatible decoders, which would be the case when the guidCategory parameter of MFTEnumEx includes MFT_CATEGORY_VIDEO_DECODER and the pInputType parameter defines the MFVideoFormat_H264 guidSubtype, hooking library 302 will replace the list of available MFTs returned by Media Foundation so that only redirecting MFT 333 is returned to application 240. In other words, when application 240 attempts to enumerate decoders that can process H.264 encoded content, hooking library 302 will ensure that only redirecting MFT 333 is enumerated. This will ensure that application 240 will employ redirecting MFT 333 in the media pipeline's topology.

Although this description is specific to the H.264 input type, it is noted that hooking library 302 can equally perform step 3*d* when other encoded video types are specified. For example, hooking library 302 may replace available MFTs with redirecting MFT 333 when the pInputType parameter defines the MFVideoFormat_H265, MFVideoFormat_HEVC, MFVideoFormat_WEBM or any other video subtype GUID. Accordingly, step 3*d* can be generalized as identifying when the call to MFTEnumEx specifies a particular encoded video input type and returning to the calling application a list containing only redirecting MFT 333.

Figure 4D:
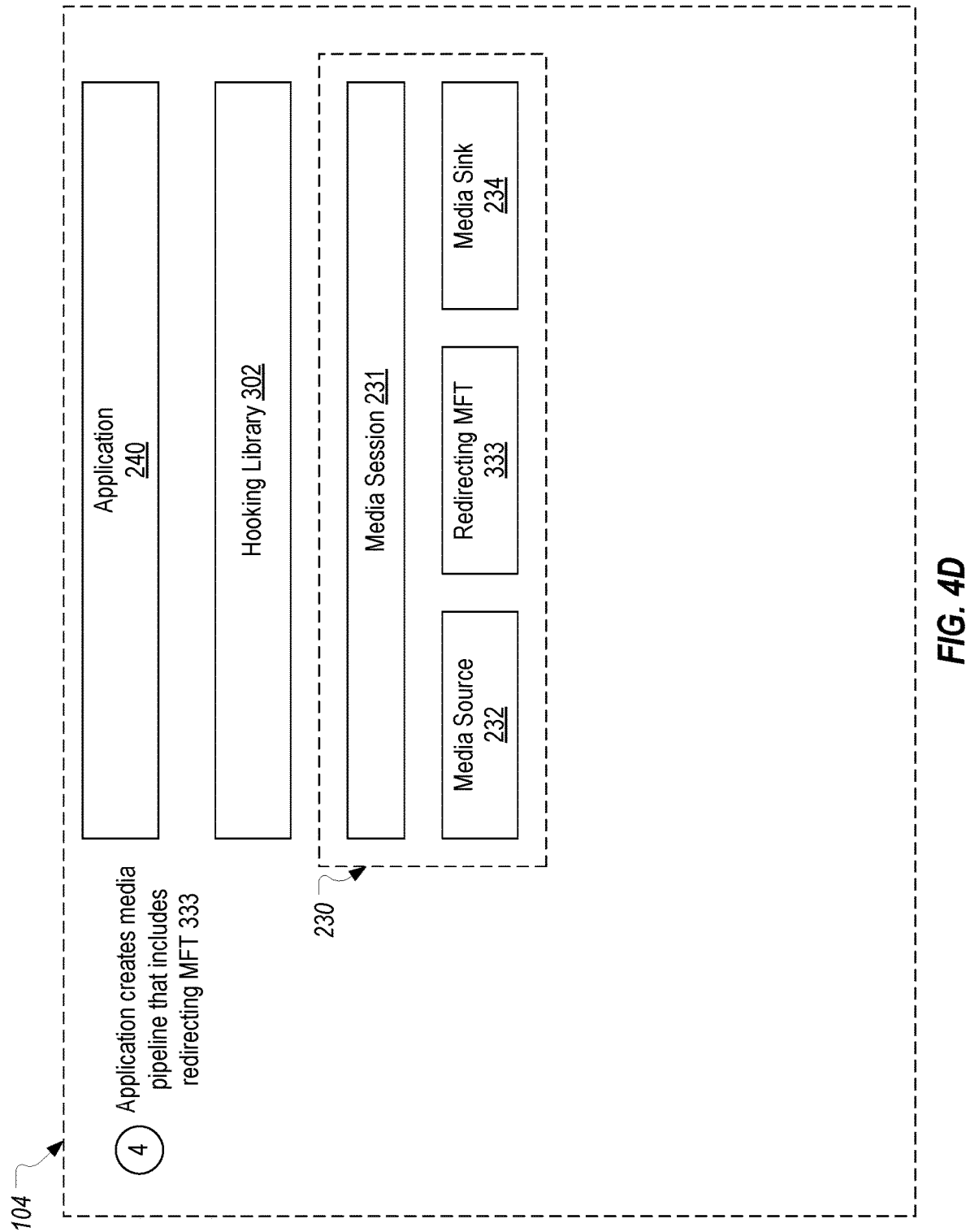

Finally, as represented in step 4 shown in FIG. 4D, application 240 will create the topology for media pipeline 230. This topology will include a media source 232 (e.g., a URL), redirecting MFT 333 and a media sink 234. The manner in which application 240 creates this topology is not essential to the invention. Of importance is the fact that hooking library 302 has caused application 240 to determine that redirecting MFT 333 is the only MFT available to process the data that media source 232 provides.

With media pipeline 230 created, application 240 can commence playing the content that media source 232 provides. FIGS. 5A-5D illustrate how hooking library 302 and redirecting MFT 333 modify this process to enable the content to be redirected to client 102. As represented as step 1*a* in FIG. 5A, to commence playback of the media content, application 240 can invoke the Start method of the IMFMediaSession interface. Because hooking library 302 returned a pointer to the proxy class when application 240 called the MFCreateMediaSession function, this call to the Start method will actually be directed to a corresponding Start method of the proxy class. In step 1*b*, hooking library 302 will intercept the request and pass it on to media session 231 (e.g., by invoking the Start method of the actual IMFMediaSession interface). As a result, in step 1*c*, media source 232 will commence providing encoded content (or samples) to redirecting MFT 333.

Figure 5A:
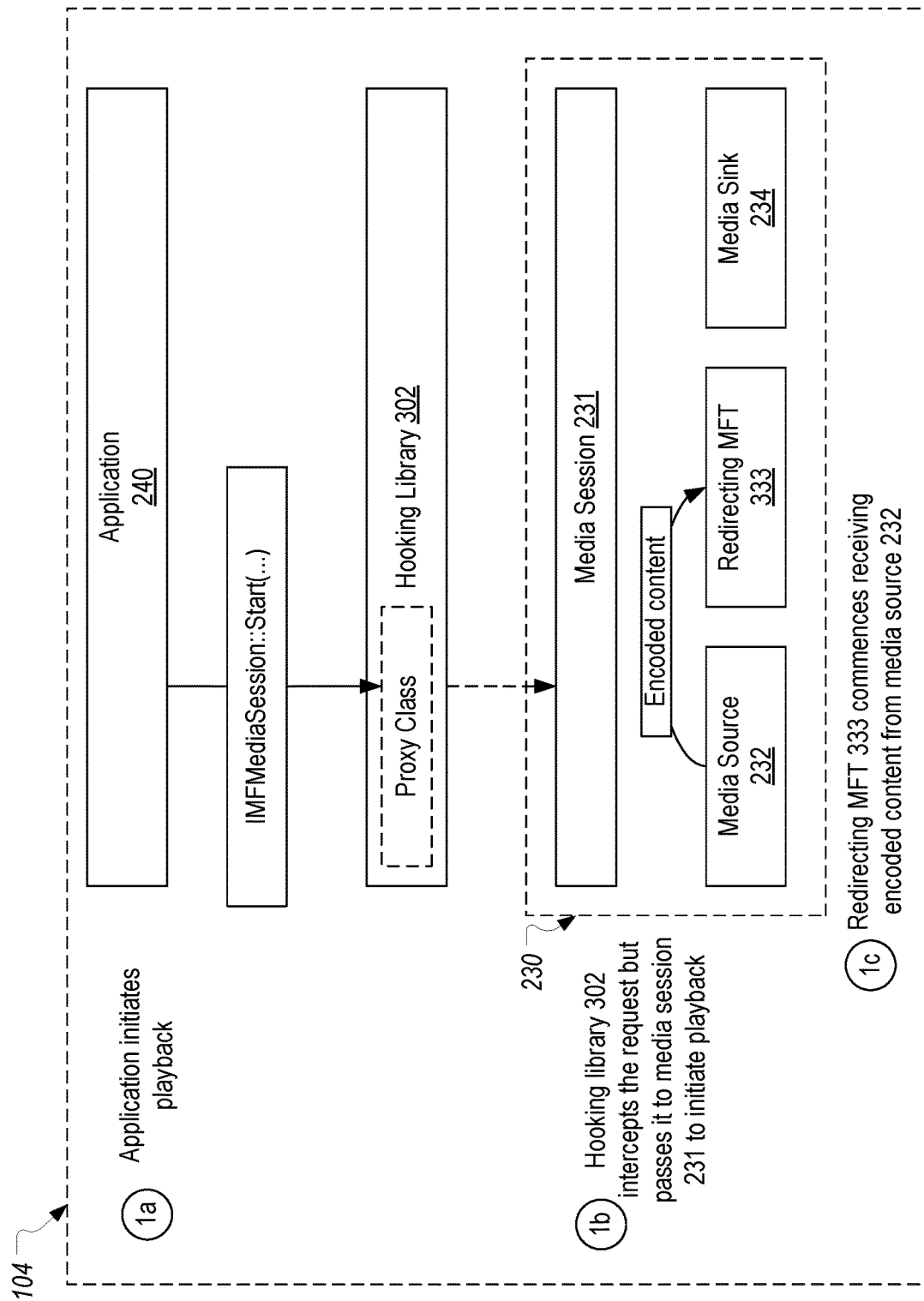
FIGS. 5A-5D illustrate how the present invention modifies the server-side playback process to enable HTML5 multimedia content to be redirected to the client.
Figure 5B:
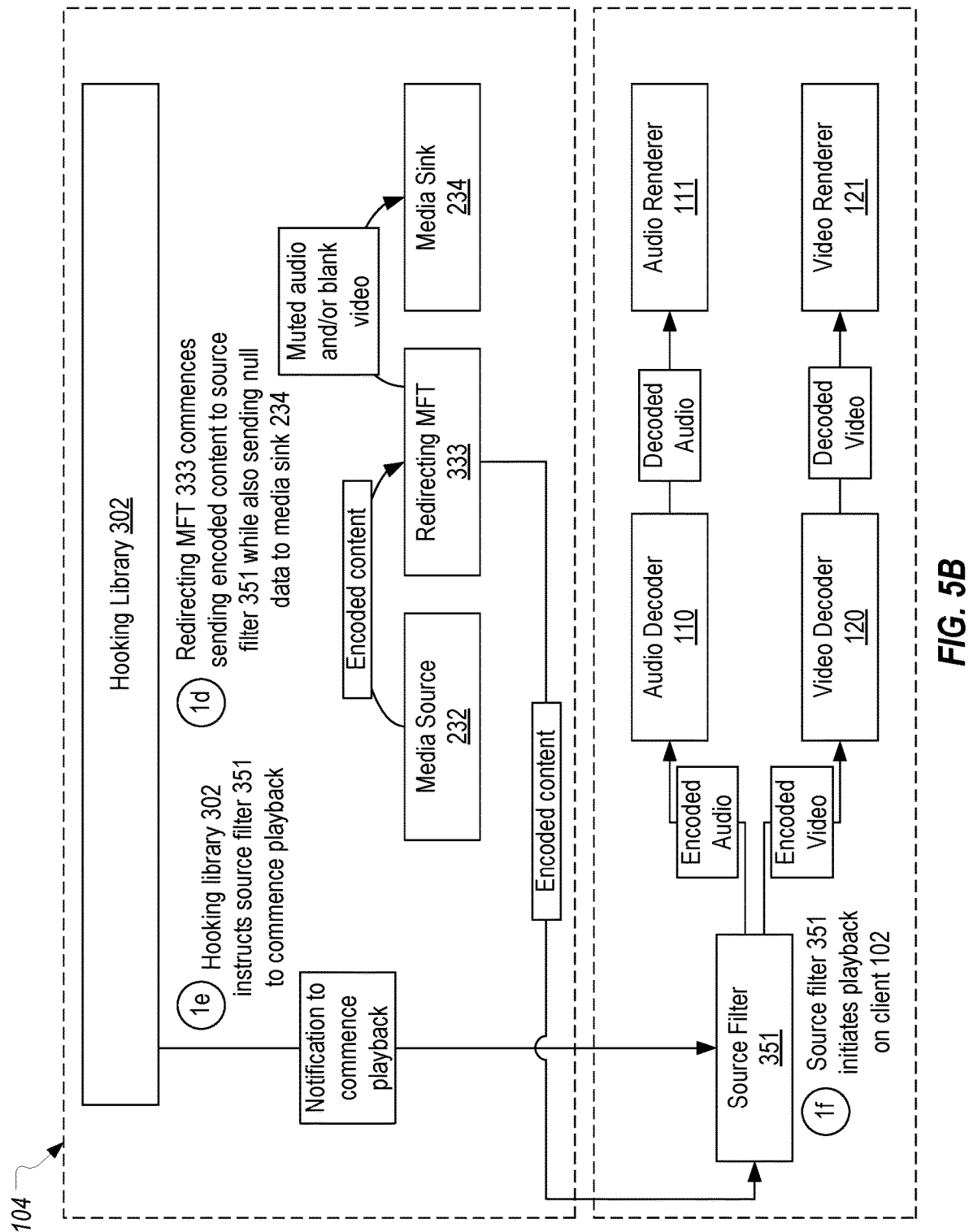

Turning to FIG. 5B, as redirecting MFT 333 receives the encoded content, it will send it over the network to source filter 351 in step 1*d*. Additionally, redirecting MFT 333 can output muted audio (or null audio) and/or blank video (e.g., RGB values of 16, 0 and 16) to media sink 234. This outputting of muted audio and blank video ensures that media session 230 will function in its intended manner (i.e., media sink 234 will receive content) without requiring any decoding on server 104. For clarity, it is again noted that redirecting MFT 333 may represent a redirecting video decoder and a redirecting audio decoder in typical implementations, and therefore media sink 234 may represent an audio renderer and a video renderer.

In step 1*e*, hooking library 302 can also send a notification to source filter 351 to commence playback of the encoded content it receives from redirecting MFT 333. In particular, the proxy class can be configured to send this notification in response to a call to its proxy version of the Start method. Accordingly, in step 1*f*, source filter 351 will commence playback of the encoded content on client 102 by providing encoded video to video decoder 120 and/or encoded audio to audio decoder 110. Audio decoder 110 will then output decoded audio to audio renderer 111 while video decoder 120 will output decoded video to video renderer 121. Importantly, the decoding of the encoded content occurs on client 102, not server 104.

Although the manner in which source filter 351 causes the encoded content to be played back on client 102 is not essential to the present invention, it is noted that source filter 351 may be configured to employ Microsoft's DirectShow when client 102 runs Windows or to employ the GStreamer framework when client 102 runs a Linux-based operating system.

Figure 5C:
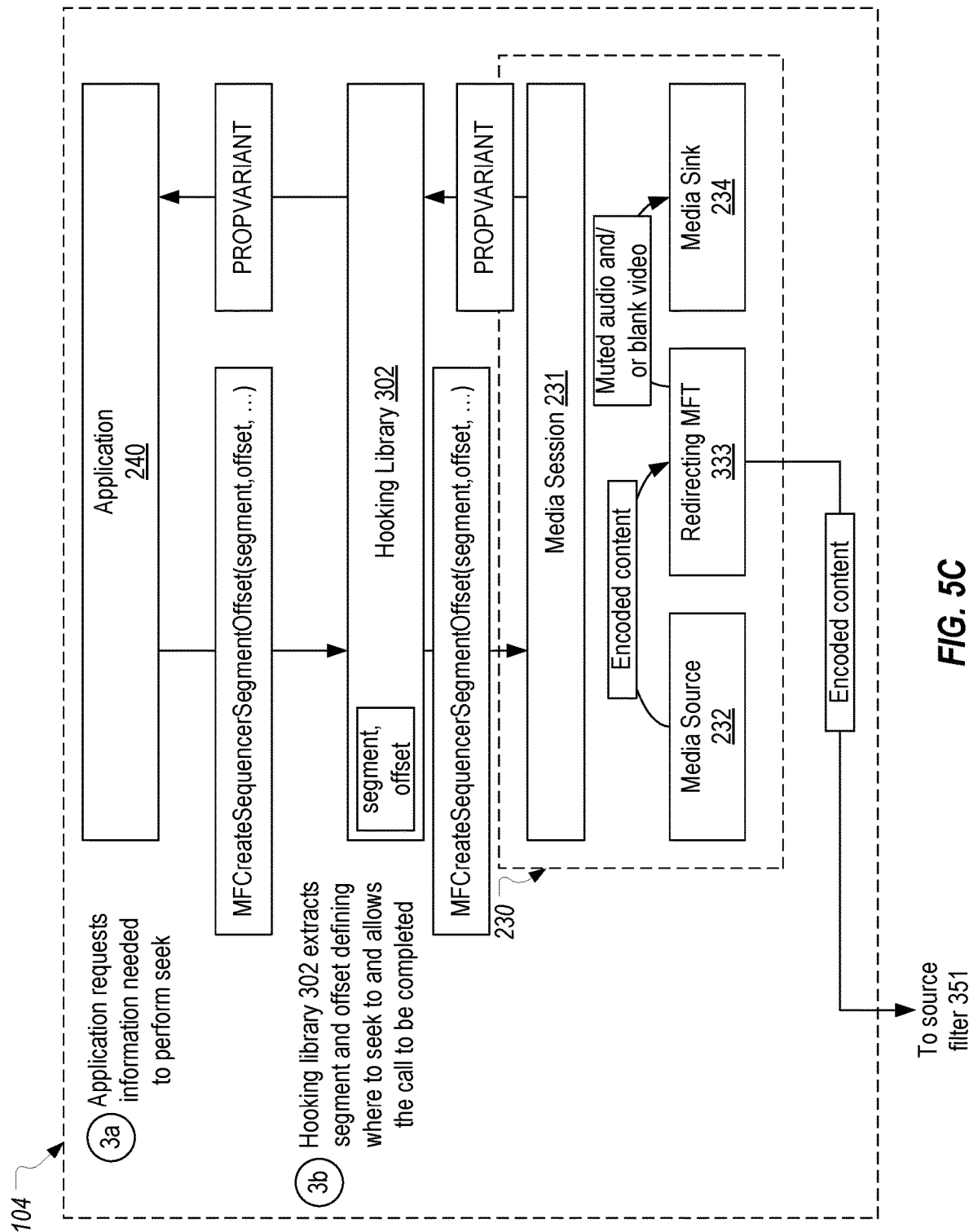
Figure 5D:
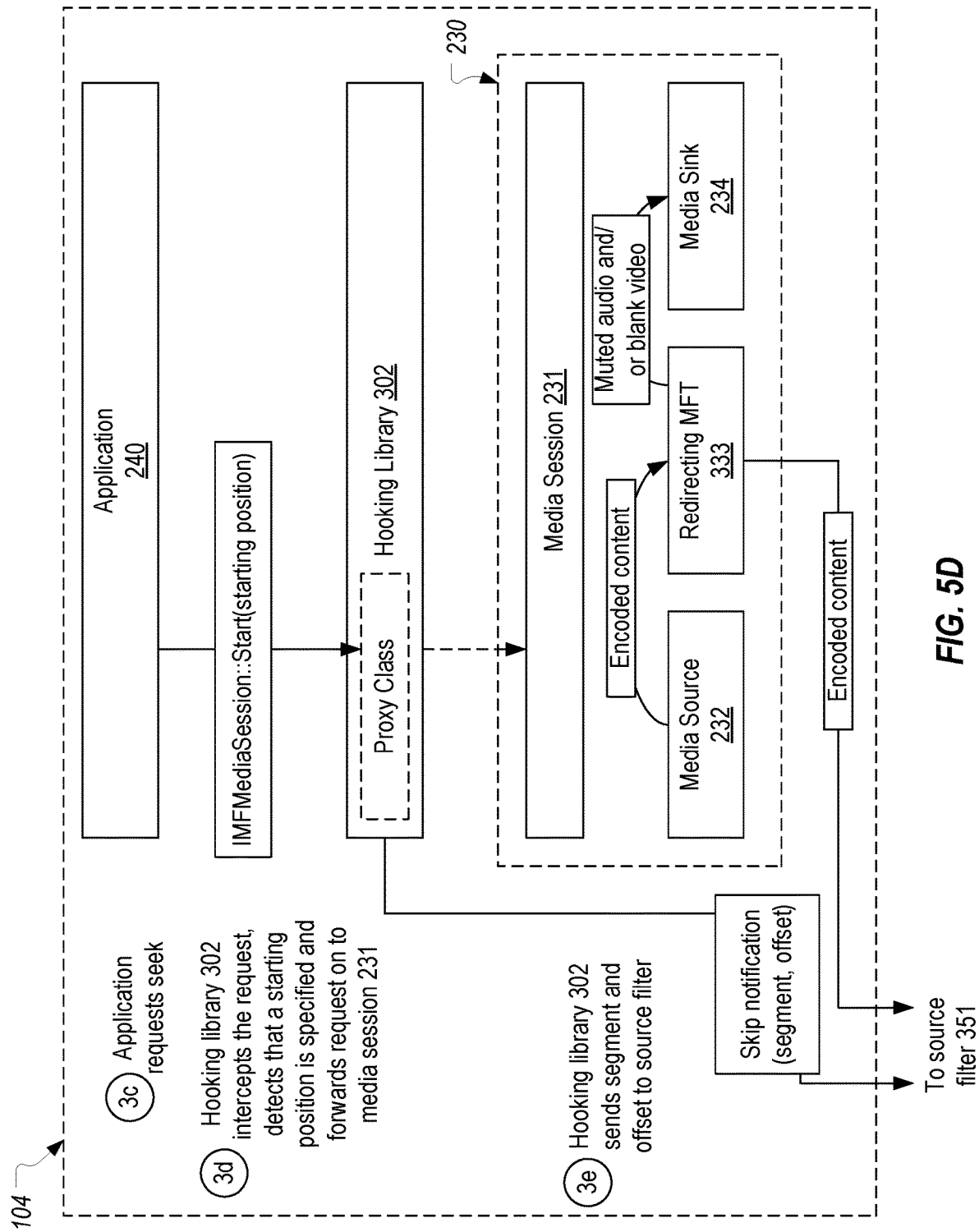

Hooking library 302 can handle other controls (e.g., pause, stop, seek, etc.) in a similar manner. For example, if application 240 calls the Pause method of the IMFMediaSession interface, the corresponding function in the proxy class can cause a pause notification to be sent to source filter 351. In the case of a seek, however, additional processing is required as is represented in FIGS. 5C and 5D. To perform a seek, the same Start method of the IMFMediaSession interface is employed, but a starting position is provided which defines where to seek to. This starting position is in the form of a PROPVARIANT structure within the Windows operating system.

To obtain the PROPVARIANT structure necessary to request a seek, application 240 must call the MFCreateSequencerSegmentOffset function of Media Foundation as shown in step 3*a*. Application 240 can then call the Start method and pass a pointer to the PROPVARIANT structure. The content of the PROPVARIANT structure that is returned by this function may not be compatible with source filter 351 (i.e., hooking library 302 cannot merely forward the PROPVARIANT to source filter 351 to request a seek). Therefore, hooking library 302 is also configured to hook the MFCreateSequencerSegmentOffset function so that it can obtain the input parameters that application 240 specifies when invoking this function. In particular, in step 3*b*, hooking library 302 intercepts the call to MFCreateSequencerSegmentOffset and extracts the segment and offset defined in the input parameters (dwId and hnsOffset). As indicated, hooking library 302 can also allow this call to pass on to media session 231 so that the PROPVARIANT can be returned to application 240. During this process, media source 232 may continue to provide encoded content to redirecting MFT 333 which can continue to send the encoded content to source filter 351.

Turning to FIG. 5D, upon receiving the PROPVARIANT in response to its call to MFCreateSequencerSegmentOffset, application 240 can then invoke the Start method and specify the PROPVARIANT to define the starting position for playback (i.e., the position to seek to). This invocation of the Start method will be handled by the proxy class in step 3*d*. Because the Start method specifies a starting position, in step 3*e*, hooking library 302 can send a seek notification that includes the segment and the offset ("seek information") that hooking library 302 had previously obtained from application 240's call to the MFCreateSequencerSegmentOffset function. Hooking library 302 can also invoke the actual Start method with the PROPVARIANT as input so that media session 231 will also implement the seek (which may entail causing media source 232 to jump forward in the content that it is providing to redirecting MFT 333). Because hooking library 302 provides the segment and offset to source filter 351, it will be able to implement a seek using whatever media framework exists on client 102.

This playback/redirection process can continue until playback is stopped or completes. In other words, while redirecting MFT 333 is receiving encoded content from media source 232, it can send the encoded content on to source filter 351 and also provide muted audio and/or blank video to media sink 234. Then, once playback is stopped or completed (i.e., once media source 232 ceases providing encoded content to redirecting MFT 333), redirecting MFT 333 can likewise cease providing muted audio and/or blank video to media sink 234. In short, redirecting MFT 333 will cause media session 231 to believe that playback is occurring in a normal manner on server 104 even though the media is being redirected to client 102. The transparency of this process enables HTML5 multimedia redirection with virtually any application that employs Media Foundation.

Figure 6:
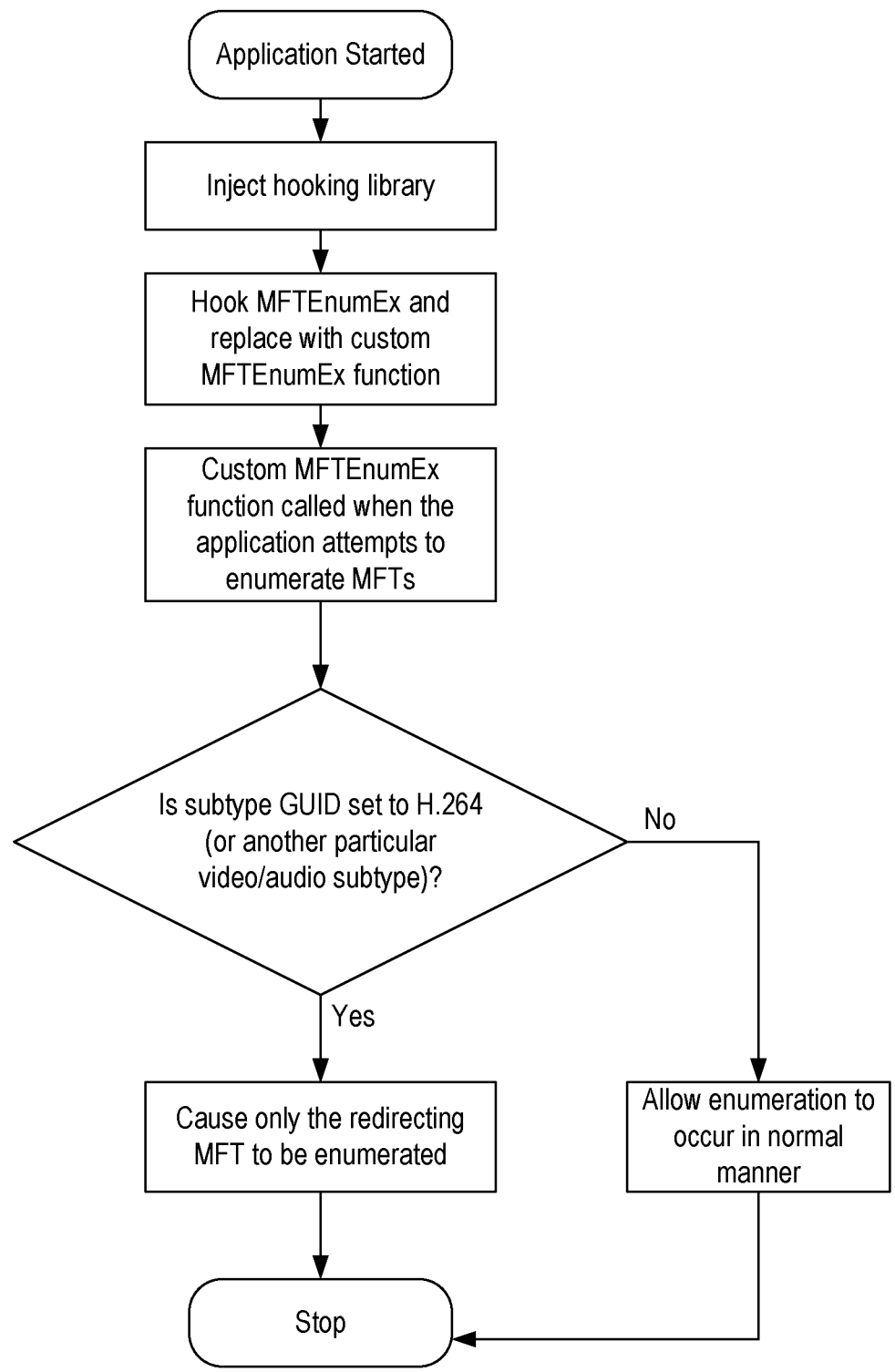
FIG. 6 provides a flow diagram summarizing the modified process of creating a media pipeline that enables HTML5 multimedia redirection.

FIG. 6 provides a flow diagram summarizing how the present invention causes a server-side application to employ redirecting MFT 333 in Media Foundation media pipeline. As shown, when an application is started, hooking library 302 is injected to thereby enable calls to the MFTEnumEx function to be hooked and replaced with a custom MFTEnumEx function. Due to the hook, when the application calls the MFTEnumEx function, the custom MFTEnumEx function will be called. This custom MFTEnumEx function can evaluate the input parameters of the MFTEnumEx function and determine whether the subtype GUID (audio and/or video) is set to H.264 (or any other encoded audio and/or video type). If the subtype GUID is not set to H.264, the custom MFTEnumEx function call allow enumeration to occur in a normal manner (e.g., by invoking the actual MFTEnumEx function and passing the results to the application). In contrast, if the subtype GUID is set to H.264, the custom MFTEnumEx can cause only the redirecting MFT (i.e., the redirecting audio MFT and/or the redirecting video MFT) to be enumerated (e.g., by replacing the MFTs that were enumerated by the actual MFTEnumEx function with the redirecting MFT).

By this process, the custom MFTEnumEx function will ensure that the application will only discover the redirecting MFT when desiring to play H.264 content even though there will likely be other MFTs capable of handling H.264 content. As a result, the application will employ the redirecting MFT in the topology of the media pipeline thereby ensuring that the encoded content will be redirected to the client rather than being decoded and rendered on the server. During this redirection, hooking library 302 will also intercept the application's calls to the various playback control methods so that controls can be synchronized between the actual playback that is occurring on the client and the perceived playback that is occurring on the server.

Figure 7:
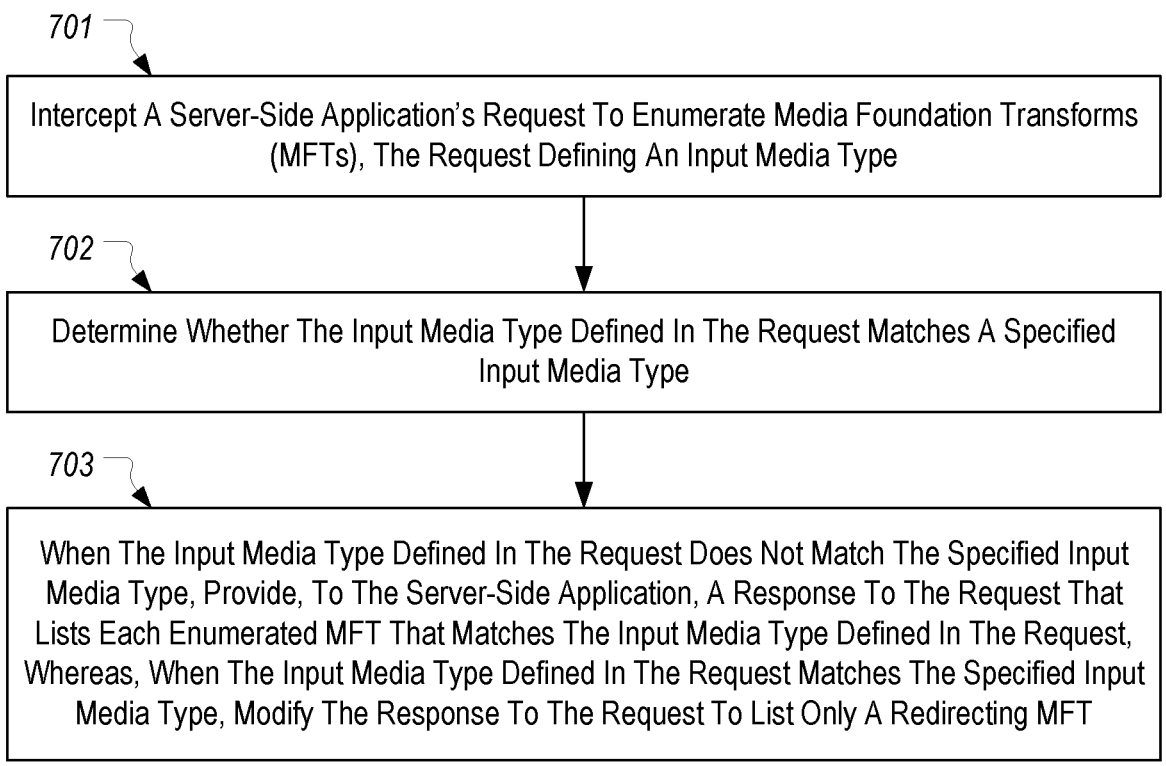
FIG. 7 provides a flowchart of an example method for implementing HTML5 multimedia redirection.

FIG. 7 provides a flowchart of an example method 700 for implementing HTML5 multimedia redirection. As an example, method 700 can be implemented by hooking library 302 when it is injected into application 240 that executes on server 104.

Method 700 includes an act 701 of intercepting a server-side application's request to enumerate MFTs, the request defining an input media type. For example, hooking library 302 can hook the MFEnumEx function, the MFEnum function and/or an equivalent function provided by Media Foundation.

Method 700 includes an act 702 of determining whether the input media type defined in the request matches a specified input media type. For example, hooking library 302 can inspect a GUID defined within the MFEnumEx function's pInputType input parameter to determine whether it matches the H.264 video subtype GUID or another encoded video or audio subtype GUID.

Method 700 includes an act 703 of, when the input media type defined in the request does not match the specified input media type, providing, to the server-side application, a response to the request that lists each enumerated MFT that matches the input media type defined in the request, whereas, when the input media type defined in the request matches the specified input media type, modifying the response to the request to list only a redirecting MFT. For example, if the request defines the H.264 video subtype (as well as requesting that video decoders be enumerated), the list of matching MFTs can be modified to include only redirecting MFT 333.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for implementing HTML5 multimedia redirection, the method comprising:
    intercepting, by a hooking library loaded on a server, a server-side application's request to enumerate media foundation transforms (MFTs) as part of creating a topology of a media pipeline on the server, the request defining an input media type;
    in response to intercepting the server-side application's request to enumerate MFTs, submitting, by the hooking library and to a media platform on the server, a separate request to enumerate MFTs, the separate request also defining the input media type that was defined in the request;
    receiving, by the hooking library and from the media platform, a response to the separate request to enumerate MFTs that includes one or more enumerated MFTs that match the input media type;
    when the input media type defined in the server-side application's request to enumerate MFTs matches a specified input media type, modifying, by the hooking library, the response to the separate request to enumerate MFTs by replacing the one or more enumerated MFTs with a redirecting MFT; and
    returning the modified response to the server-side application as a response to the server-side application's request to enumerate MFTs to thereby cause the server-side application to employ the redirecting MFT in the topology of the media pipeline.

2. The method of claim 1, wherein submitting the separate request to enumerate MFTs comprises calling the MFEnumEx function.

3. The method of claim 1, wherein the input media type comprises encoded video.

4. The method of claim 3, wherein the redirecting MFT is a redirecting video MFT.

5. The method of claim 3, wherein the encoded video comprises H.264 encoded video.

6. The method of claim 1, wherein the input media type comprises encoded audio.

7. The method of claim 6, wherein the redirecting MFT is a redirecting audio MFT.

8. The method of claim 1, wherein the input media type defined in the request comprises both encoded video and encoded audio, and wherein the redirecting MFT comprises a redirecting video MFT and a redirecting audio MFT.

9. The method of claim 1, wherein intercepting the server-side application's request to enumerate MFTs comprises hooking the MFEnumEx function.

10. The method of claim 1, further comprising:
    receiving, at the redirecting MFT, encoded multimedia content; and
    redirecting, by the redirecting MFT, the encoded multimedia content to a client.

11. The method of claim 10, further comprising:
    intercepting the server-side application's request to control playback of the encoded multimedia content; and
    redirecting the request to control playback to the client.

12. The method of claim 11, wherein the request to control playback comprises a request to perform a seek, and wherein redirecting the request to perform a seek comprises sending to the client seek information that was obtained from the server-side application's previous call to the MFCreateSequencerSegmentOffset function.

13. The method of claim 11, wherein intercepting the server-side application's request to control playback of the encoded multimedia content comprises hooking the MFCreateMediaSession function and providing a proxy class to the server-side application when the server-side application calls the MFCreateMediaSession function.

14. The method of claim 10, wherein redirecting the encoded multimedia content to the client comprises sending the encoded multimedia content to a source filter that is executing on the client.

15. The method of claim 10, further comprising:
    in conjunction with redirecting the encoded multimedia content to the client, providing, by the redirecting MFT, one or both of muted audio content or blank video content to a media sink in the topology of the media pipeline.

16. One or more computer storage media storing computer executable instructions which when executed implement a method for implementing HTML5 multimedia redirection, the method comprising:
    injecting a hooking library into a server-side application, the hooking library configured to hook an enumeration function of a server-side media platform that the server-side application calls to enumerate media foundation transforms (MFTs) as part of creating a topology of a media pipeline on the server;
    in response to the server-side application calling the enumeration function, determining, by the hooking library, that the server-side application is requesting enumeration of MFTs that are configured to process a particular type of encoded content;
    in response to the server-side application calling the enumeration function, calling, by the hooking library, the enumeration function;
    in response to the hooking library calling the enumeration function, receiving, by the hooking library, a response that includes one or more MFTs that are configured to process the particular type of encoded content;
    modifying the response by replacing the one or more MFTs that are configured to process the particular type of encoded content with a redirecting MFT; and
    in response to the server-side application calling the enumeration function, providing the modified response to the server-side application to thereby cause the server-side application to employ the redirecting MFT in the topology of the media pipeline.

17. The computer storage media of claim 16, wherein the hooking library is also configured to hook a create function that is called to create a media session on the server, the method further comprising:
    in response to the server-side application calling the create function, returning to the server-side application a proxy class implemented by the hooking library.

18. The computer storage media of claim 16, wherein the hooking library is also configured to hook a sequencer function that is called to create a data structure to be used to perform a seek, the method further comprising:

in response to the server-side application calling the sequencer function, extracting and storing seek information that is specified as input to the sequencer function; and in response to the server-side application calling a seek function to perform a seek during playback of multimedia content, providing the seek information to a client to which the multimedia content is being redirected.

19. One or more computer storage media storing computer executable instructions which when executed on a server implement the following components:

a hook injector that is configured to inject a hooking library into a multimedia application that executes on the server;

the hooking library that is configured to hook an enumeration function of a media platform that the application calls to enumerate media foundation transforms (MFTs) on the server and to modify a response to the enumeration function by replacing one or more MFTs for a particular input media type with a redirecting MFT to thereby cause only the redirecting MFT to be enumerated for the particular input media type, the hooking library also being configured to hook a create function of the media platform that the application calls to create a media session on the server to thereby present a proxy class to the application when the application calls the create function; and the redirecting MFT that is configured to receive encoded content from a media source on the server and to redirect the encoded content to a client.

20. The computer storage media of claim 19, wherein the redirecting MFT comprises one or both of a redirecting video MFT or an audio redirecting MFT.

* * * * *